United States Patent
Fan et al.

(10) Patent No.: US 8,883,867 B2
(45) Date of Patent: Nov. 11, 2014

(54) COMPOSITIONS AND METHODS FOR RECYCLING PLASTICS COMPRISING POLYMERS VIA SOLVENT TREATMENT

(75) Inventors: Liang-tseng Fan, Manhattan, KS (US); Shahram Reza Shafie, Austin, TX (US)

(73) Assignee: Green Source Holdings LLC, Austin, TX (US)

( * ) Notice: Subject to any disclaimer, the term of this patent is extended or adjusted under 35 U.S.C. 154(b) by 0 days.

(21) Appl. No.: 13/821,677

(22) PCT Filed: Sep. 6, 2011

(86) PCT No.: PCT/US2011/050515
§ 371 (c)(1),
(2), (4) Date: May 30, 2013

(87) PCT Pub. No.: WO2012/033742
PCT Pub. Date: Mar. 15, 2012

(65) Prior Publication Data
US 2013/0237620 A1    Sep. 12, 2013

Related U.S. Application Data

(60) Provisional application No. 61/381,633, filed on Sep. 10, 2010.

(51) Int. Cl.
| C08J 11/04 | (2006.01) |
| C08J 11/08 | (2006.01) |
| C08J 11/24 | (2006.01) |
| C08J 11/20 | (2006.01) |

(52) U.S. Cl.
CPC .............. *C08J 11/24* (2013.01); *C08J 2327/04* (2013.01); *C08J 11/08* (2013.01); *C08J 11/20* (2013.01); *C08J 2327/06* (2013.01)
USPC ............. 521/44.5; 521/40; 521/41; 521/46.5; 521/47; 521/48; 528/480; 528/491; 528/502 R; 528/502 A; 528/503; 210/295; 210/323.1

(58) Field of Classification Search
CPC ............ C08J 11/08; C08J 11/20; C08J 11/24; C08L 27/06
USPC ........... 521/40, 40.5, 41, 44.5, 46, 47, 48, 49, 521/49.8; 528/480, 481, 491, 492, 493, 528/494, 495, 496, 497, 498, 503, 502 R; 210/295, 323.1
See application file for complete search history.

(56) References Cited

U.S. PATENT DOCUMENTS

| 1,843,388 | A | * | 2/1932 | Taliaferro | .................. 521/44.5 |
| 3,701,741 | A | | 10/1972 | Meyer, Jr. et al. | |
| 4,003,881 | A | | 1/1977 | Sidebotham et al. | |
| 4,031,039 | A | | 6/1977 | Mizumoto et al. | |
| 4,089,773 | A | | 5/1978 | Espenscheid | |
| 4,137,393 | A | | 1/1979 | Sidebotham et al. | |
| 4,145,188 | A | | 3/1979 | Espenscheid et al. | |
| 4,594,371 | A | | 6/1986 | Nauman | |
| 4,939,036 | A | * | 7/1990 | Reith | ............................ 428/349 |
| 5,198,471 | A | | 3/1993 | Nauman et al. | |
| 5,278,282 | A | | 1/1994 | Nauman et al. | |
| 5,445,659 | A | | 8/1995 | Khan et al. | |
| 5,473,000 | A | * | 12/1995 | Pinomaa | ........................ 524/59 |
| 5,530,049 | A | | 6/1996 | Dee et al. | |
| 6,872,754 | B1 | | 3/2005 | Wortham | |
| 7,569,658 | B2 | | 8/2009 | Vandenhende et al. | |
| 2005/0154070 | A1 | | 7/2005 | Suzuki et al. | |
| 2006/0178442 | A1 | | 8/2006 | Lee et al. | |
| 2008/0113146 | A1 | * | 5/2008 | Wright et al. | ................... 428/95 |
| 2009/0078415 | A1 | | 3/2009 | Fan et al. | |

FOREIGN PATENT DOCUMENTS

| FR | 2776663 A1 | | 10/1999 |
| JP | 51-17994 | * | 6/1976 |
| JP | 01171833 | * | 7/1989 |
| JP | 2003-193064 | * | 7/2003 |

OTHER PUBLICATIONS

Derwent abstract of JP 76017994.*
Machine translation of JP 2003-193064.*
Derwent abstract of JP 01171833.*
Haisa, M., *Polymers* ( in Japanese), Kagakudozin, Tokyo, Japan, (1967). Abstract Only.
Hegberg, B. A., G. R. Brenniman, and W. H. Hallenbeck, *Mixed Plastics Recycling Technology*, Noyes Data Corporation, Park Ridge, NJ, (1992). Abstract Only.
Starnes, W. H., Jr., "Mechanistic Aspects of the Degradation and Stabilisation of Poly(Vinyl Chloride)," In: *Developments in Polymer Degradation*, Applied Science Publishers, London, pp. 135-171 (1981). Abstract Only.
Wilkes, C. E., J. W. Summers, and C. A. Daniels, *PVC Handbook*, Carl Hanser Verlag, Munich, (2005). Abstract Only.
Achilias, D. S., C. Roupakias, P. Megalokonomos, A. A. Lappas, and E. V. Antonakou, "Chemical Recycling of Plastic Wastes made from Polyethylene (LDPE and HDPE) and Polypropylene (PP)" *J. Hazard. Mater.*, 149, 536-542 (2007). Abstract Only.

(Continued)

*Primary Examiner* — Frances Tischler
(74) *Attorney, Agent, or Firm* — Rothwell, Figg, Ernst & Manbeck, P.C.

(57) ABSTRACT

Compositions containing a turpentine liquid and methods are disclosed for dissolving, dissolving via melting, selectively dissolving via melting, decomposing plastic comprising a chlorine-containing polymer or thermosetting polymer, and/or co-dissolving plastic with fossil fuel for purifying, separating, recovering or recycling plastic-containing material.

46 Claims, No Drawings

(56) References Cited

OTHER PUBLICATIONS

Behnisch, J. and H. Zimmermann, "Kinetics and Mechanism of the Polyene Formation during Dehydrochlorination of Poly(Vinyl Chloride) in the Solid State," *Int. J. Polym. Mater.*, 16, 143 (1992). Abstract Only.

Bonsignore, P. V., B. J. Jody, and E. Daniels, "Separation Techniques for Auto Shredder Residue," In: Proceedings of SAE International Congress and Exhibition, Feb. 25-Mar. 1, Detroit, MI, pp. 59-63 (1991). Abstract Only.

Bornmann, J. A., "Chemical Reactions in the Low-Temperature Decomposition of an Epoxy Resin," *J. Polymer Sci. C Polymer Lett.*, 26, 409-412 (1988). Abstract Only.

Cavanaugh, T. J. and E. B. Nauman, "The Future of Solvents in the Polymer Industry," *Trends Polymer Sci*, 3, 48-52 (1995). Abstract Only.

Cooper, W. J., P. D. Krasicky, and F. Rodriguez, "Dissolution Rates of Poly(Methyl Methacrylate) Films in Mixed Solvents," *J. Appl. Polym. Sci.*, 31, 65-73 (1986). Abstract Only.

Devoy, C., L. Mandelkern, and L. Bourland, "Crystallization Kinetics of Dilute Polyethlene Solutions" *J. Polym. Sci. A-2*, 8, 869-882 (1970). Abstract Only.

Drain, K. F., W. R. Murphy, and M. S. Otterburn, "Polymer Waste—Resource Recovery" *Conservat. Recycl.*, 4, 201-218 (1981). Abstract Only.

Feng, Z., J. Zhao, J. Rockwell, D. Bailey, and G. Huffman, "Direct Liquefaction of Waste Plastics and Coliquefaction of Coal-Plastic Mixtures," *Fuel Process. Technol.*, 49, 17-30 (1996). Abstract Only.

Furno, J. S. and E. B. Nauman, "A Novel Heat-Resistant Blend Produced by Compositional Quenching: A Thermoplastic Polyimide Impact-Modified with a Fluoroelastomer," *Polymer*, 32, 88-94 (1991). Abstract Only.

Gouli, S., J. G. Poulakis, and C. D. Papaspyrides, "Solvent Recycling of Poly(Methyl Methacrylate) Decorative Sheets," *Adv. Polym. Technol.*, 13, 207-211 (1994). Abstract Only.

Groele, R. J., P. D. Krasicky, S. -. Chun, J. Sullivan, and F. Rodriguez, "Dissolution Rates of Poly(Methyl Methacrylate) in Mixtures of Nonsolvents," *J. Appl. Polym. Sci.*, 42, 3-8 (1991). Abstract Only.

Hong, P. and H. Huang, "Effect of Polymer-Solvent Interaction on Gelation of Polyvinyl Chloride Solutions" *Eur. Polymer J.*, 35, 2155-2164 (1999). Abstract Only.

Hu, L., A. Oku, E. Yamada, and K. Tomari, "Alkali-Decomposition of Poly(Ethylene Terephthalate) in Mixed Media of Nonaqueous Alcohol and Ether. Study on Recycling of Poly(Ethylene Terephthalate)," *Polym. J.*, 29, 708-712 (1997). Abstract Only.

Jackson, J. F. and L. Mandelkern, "Solubility of Crystalline Polymers. II. Polyethylene Fractions Crystallized from Dilute Solutions," *Macromolecules*, 1, 546-554 (1968). Abstract Only.

Kim, D. M. and E. B. Nauman, "Solution Viscosity of Polystyrene at Conditions Applicable to Commercial Manufacturing Processes" *J. Chem. Eng. Data*, 37, 427-432 (1992). Abstract Only.

Krasicky, P. D., R. J. Groele, J. A. Jubinsky, F. Rodriguez, Y. M. N. Namaste, and S. K. Obendorf, "Studies of Dissolution Phenomena in Microlithography" *Polymer Eng. Sci.*, 27, 282-285 (1987). Abstract Only.

Lei, C. P., T. Long, S. K. Obendorf, and F. Rodriguez, "Dissolution Rates of Copolymers Based on 4-Hydroxystyrene and Styrene," *Polym. Mater. Sci. Eng.*, 66, 113-114 (1992). Abstract Only.

Luo, M. and C. W. Curtis, "Thermal and Catalytic Coprocessing of Illinois No. 6. Coal with Model and Commingled Waste Plastics," *Fuel. Process. Technol.*, 49, 91-117 (1996). Abstract Only.

Luo, M. and C. W. Curtis, "Effect of Reaction Parameters and Catalyst Type on Waste Plastics Liquefaction and Coprocessing with Coal," *Fuel Process. Technol.*, 49, 177-196 (1996). Abstract Only.

Lynch, J. C., and E. B. Nauman, "Recycling Commingled Plastics Via Selective Dissolution," In: Proceedings of Tenth International Coextrusion Conference COEX '89, Sep. 20-22, Princeton, NJ, pp. 99-110 (1989). Abstract Only.

Lynch, J. C., and E. B. Nauman, "Separation of Commingled Plastics by Selective Dissolution," In: Proceedings of New Developments in Plastic Recycling, Oct. 30-31, Charlotte, NC, (1989). Abstract Only.

Mandelkern, L., "The Crystallization Kinetics of Polymer-Diluent Mixtures: The Temperature Coefficient of the Process," *Polymer*, 5, 637-648 (1964). Abstract Only.

Miller-Chou, B. A. and J. L. Koenig, "A Review of Polymer Dissolution," *Prog. Polym. Sci.*, 28, 1223-1270 (2003). Abstract Only.

Minsker, K. S., M. I. Abdullin, R. R. Gizatullin, A. L. Buchachenko, and G. E. Zaikov, "Solvation Stabilization of Vinyl Chloride Polymers to Degradation in Solution," *Polym. Degrad. Stab.*, 21, 205-210 (1988). Abstract Only.

Negami, M., K. Sano, M. Yoshimura, and S. Tasaka, "Dissolution Method of Unsaturated Polyester in Bean Oil," *JSAE Rev.*, 24, 221-225 (2003). Abstract Only.

Papaspyrides, C. D., S. Gouli, and J. G. Poulakis, "Recovery of Poly(Methyl Methacrylate) by the dissolution/reprecipitation Process: A Model Study," *Adv. Polym. Technol.*, 13, 213-218 (1994). Abstract Only.

Pappa, G., C. Boukouvalas, C. Giannaris, N. Ntaras, V. Zografos, K. Magoulas, A. Lygeros, and D. Tassios, "The Selective dissolution/precipitation Technique for Polymer Recycling: A Pilot Unit Application," *Resour. Conserv. Recycling*, 34, 33-44 (2001). Abstract Only.

Prasad, A. and L. Mandelkern, "Equilibrium Dissolution Temperature of Low Molecular Weight Polyethylene Fractions in Dilute Solution," *Macromolecules*, 22, 914-920 (1989). Abstract Only.

Rodriguez, F., R. J. Groele, and P. D. Krasicky, "Dissolution Rates of Thin Polymer Films using Laser Interferometry," In: Proceedings of Advances in Resist Technology and Processing II, Mar. 11-12, Santa Clara, CA, pp. 14-20 (1985). Abstract Only.

Rodriguez, F., P. D. Krasicky, and R. J. Groele, "Dissolution Rate Measurements," *Solid State Tech.*, 28, 125-131 (1985). Abstract Only.

Rodriguez, F. and P. D. Killian, "Dissolution Rates for Thin Films of Miscible Polymer Blends," *J. Appl. Polym. Sci.*, 66, 2015-2020 (1997). Abstract Only.

Sánchez, G., Z. Brito, V. Mujica, and G. Perdomo, "The Thermal Behaviour of Cured Epoxy-Resins. the Influence of Metallic Fillers," *Polym. Degrad. Stab.*, 40, 109-114 (1993). Abstract Only.

Sano, K., M. Negami, M. Yoshimura, M. Takayanagi, T. Saito, S. Tajika, and S. Tasaka, "Development of Dissolution Method and Unit Operation using Vegetable Oil for Plastic Recycling (in Japanese)," *Gakujutsu Koenkai Maezurishu*, 60-3, 7-10 (2003). Abstract Only.

Sato, Y., K. Saito, and H. Tachibana, "Liquefaction of General Plastic Waste (in Japanese)," *Haikibutsu Gakkai shi*, 13, 99-106 (2002). Abstract Only.

Scott, D. S., P. Majerski, J. Piskorz, D. Radlein, and M. Barnickel, "Production of Liquid Fuels from Waste Plastics," *Can. J. Chem. Eng.*, 77, 1021-1027 (1999). Abstract Only.

Shah, N., J. Rockwell, and G. P. Huffman, "Conversion of Waste Plastic to Oil: Direct Liquefaction Versus Pyrolysis and Hydroprocessing," *Energ. Fuel.*, 13, 832-838 (1999). Abstract Only.

Sivakumar, P., H. Jung, J. W. Tierney, and I. Wender, "Liquefaction of Lignocellulosic and Plastic Wastes with Coal using Carbon Monoxide and Aqueous Alkali," *Fuel Process. Technol.*, 49, 219-232 (1996). Abstract Only.

Sperber, R. J. and S. L. Rosen, "Recycling of Thermoplastic Waste: Phase Equilibrium in Polystyrene-PVC-Polyolefin-Solvent Systems," *SPE ANTEC Technical Papers*, 21, 521-524 (1975). Abstract Only.

Sperber, R. J. and S. L. Rosen, "Recycling of Thermoplastic Waste: Phase Equilibrium in Polystyrene-PVC-Polyolefin Solvent Systems," *Polymer Eng. Sci.*, 16, 246-251 (1976). Abstract Only.

Srivastava, A. P. and E. B. Nauman, "Kinetics of Solvent Induced Melting of Semi-Crystalline Polymers," *Polym. Mater. Sci. Eng.*, 69, 307-308 (1993). Abstract Only.

Taghiei, M. M., Z. Feng, F. E. Huggins, and G. P. Huffman, "Coliquefaction of Waste Plastics with Coal," *Energ. Fuel.*, 8, 1228-1232 (1994). Abstract Only.

Theodoropoulos, A. G., G. N. Valkanas, D. H. Stergiou, and A. G. Vlysidis, "Recycling of Hydrophobic Polymeric Materials in the Form of Hydrogels and Swelling Promotion Thereof," *Macromolecular Reports*, A31, 9-17 (1994). Abstract Only.

(56) References Cited

OTHER PUBLICATIONS

Vane, L., and F. Rodriguez, "Selective Dissolution: Multi-Solvent, Low Pressure Solution Process for Resource Recovery from Mixed Post-Consumer Plastics," In: Proceedings of Recycling Technology of the 90's: RETEC, pp. 100-109 (1990). Abstract Only.

Wakimoto, K., H. Toyota, Y. Uchida, Y. Tomii, and M. Iwase, "Thermal Decomposition of Polyvinyl Chloride for the Removal of Chlorine," *High Temp. Mater. Process.*, 21, 237-242 (2002). Abstract Only.

Wang, L. and P. Chen, "Development of First-Stage Co-Liquefaction of Chinese Coal with Waste Plastics," *Chem. Eng. Process.*, 43, 145-148 (2004). Abstract Only.

Wielgolinski, L., "A Family of Functionalized Acrylic Polymers with Unique Solubility Properties for Recycling Applications," In: Proceedings of New Developments in Plastic Recycling: RETEC, Oct. 30-31, pp. 1-9 (1989). Abstract Only.

Yamaye, M., T. Hashime, K. Yamamoto, Y. Kosugi, N. Cho, T. Ichiki, and T. Kito, "Chemical Recycling of Poly(Ethylene Terephthalate). 2. Preparation of Terephthalohydroxamic Acid and Terephthalohydrazide," *Ind. Eng. Chem. Res.*, 41, 3993-3998 (2002). Abstract Only.

Yoshinaga, T., M. Yamaye, T. Kito, T. Ichiki, M. Ogata, J. Chen, H. Fujino, T. Tanimura, and T. Yamanobe, "Alkaline Dechlorination of Poly(Vinyl Chloride) in Organic Solvents Under Mild Conditions," *Polym. Degrad. Stab.*, 86, 541-547 (2004). Abstract Only.

Yoshioka, T., T. Akama, M. Uchida, and A. Okuwaki, "Analysis of Two Stages Dehydrochlorination of Poly(Vinyl Chloride) using TG-MS," *Chem. Lett.*, 29, 322-323 (2000). Abstract Only.

Yoshioka, T., N. Saitoh, and A. Okuwaki, "Temperature Dependence on the Activation Energy of Dechlorination in Thermal Degradation of Polyvinylchloride" *Chem. Lett.*, 34, 70-71 (2005). Abstract Only.

Yoshioka, T., T. Kameda, G. Grause, S. Imai, and A. Okuwaki, "Effect of Compatibility between Solvent and Poly(Vinyl Chloride) on Dechlorination of Poly(Vinyl Chloride)" *J. Polym. Res.*, 17, 489-493 (2010). Abstract Only.

Zia, K. M., H. N. Bhatti, and I. Ahmad Bhatti, "Methods for Polyurethane and Polyurethane Composites, Recycling and Recovery: A Review," *React. Funct. Polym.*, 67, 675-692 (2007). Abstract Only.

Zuoyun, H., H. Xingzhou, and S. Gang, "Study of the Mechanism of Thermal Degradation of Poly(Vinyl Chloride)," *Polym. Degrad. Stab.*, 24, 127-135 (1989). Abstract Only.

\* cited by examiner

US 8,883,867 B2

COMPOSITIONS AND METHODS FOR RECYCLING PLASTICS COMPRISING POLYMERS VIA SOLVENT TREATMENT

CROSS REFERENCE TO RELATED APPLICATIONS

This application is a 35 U.S.C. §371 National Phase Entry Application from PCT/US2011/050515, filed Sep. 6, 2011, and designating the United States, which claims the benefit of U.S. Provisional Patent Application No. 61/381,633 filed Sep. 10, 2010, the entire disclosures of which are incorporated herein in herein by reference.

FIELD OF THE INVENTION

The present disclosure relates generally to compositions and methods for dissolution, dissolution via melting, selective dissolution or decomposition of plastics comprising polymers, or co-dissolution of plastics comprising polymers with fossil fuel. Plastics comprising thermoplastic or thermosetting polymers are available in various forms, such as rigid, deformable, soft, elastic or inelastic dust powders, granules, pellets, flakes, chips, plates, sheets, membranes, crumbs, chunks and blocks. Moreover, these plastics can be regular or irregular in shape and size.

BACKGROUND OF THE INVENTION

The dissolution of plastics comprising polymers has long been known and practiced. For instance, a plastic is dissolved in a solvent to prepare a solution, which is applied to the surface of a solid objective to be coated with this plastic or is used in adhering two or more solid objects. The dust of a plastic contaminating the surface of a solid object can be dissolved by a solvent for cleaning. A plastic, mixed with other non-plastic materials as an impurity, can be removed by dissolving it.

The economically viable and sustainable recycling of discarded plastics has been an extremely challenging problem. This problem can be attributed to the fact that discarded plastics are almost always mixed or commingled with other plastics comprising various polymers. Nevertheless, economic motivations, environmental constraints, regulatory requirements and/or societal desires urgently demand that the used or discarded plastics be recovered or recycled to the maximum extent possible. Moreover, it is almost always preferable or necessary that any discarded mixture of plastics be separated into individual plastics prior to recycling for reuse. In the two most common methods, a discarded or waste mixture of plastics to be reused is crushed to form coarse particles or pellets, which are subsequently pyrolyzed or melted and intensively shear-mixed in their entirety. The former yields a fuel gas and/or oil, and the latter produces homogeneous solid blocks. Unfortunately, both methods yield relatively low-value added products of low quality.

Different mechanical methods have been proposed or deployed to separate mixtures of discarded plastics into individual plastics, each comprising one variety of polymer. Some of major methods include, manual sorting, sieving, filtration, flotation, air cycloning, and hydrocycloning, and combinations thereof. These methods are effected by different physical properties and/or morphological characteristics of plastics in the mixtures, such as density, size, shape, and combinations thereof. Often, however, it is extremely difficult to achieve clean separation between various plastics due to the closeness of their physical properties and/or morphological characteristics as well as due to the contamination by non-plastic materials, e.g., metals, papers and soils. Furthermore, it is nearly impossible to separate a mixture of plastics sharply, i.e., with high resolution, if any one of plastics itself is a mixture. Examples of such plastics are a multilayered plastic, composite plastic comprising interpenetrating polymers, and composite plastic formed by ultra high-pressure fusion.

Methods of selective dissolution have been proposed or deployed to circumvent the above-mentioned difficulties encountered in separating physically mixed or commingled solid plastics comprising various polymers by purely mechanical means. These methods take advantage of the fact that the solubilities of plastics are dissimilar in different organic solvents, and they vary differently with temperature. Some selective dissolution methods for separating physically mixed or commingled plastics into individual plastics, each comprising a single polymer, have been developed on the basis of the above-mentioned solubility characteristics of plastics. Methods have also been developed to dissolve an individual plastic or polymer with one or more solvents. Such methods deploy a wide variety of organic solvents.

U.S. Pat. No. 3,701,741 discloses a process of recovering substantially pure polyethylene terephthalate from contaminated scrap polyethylene terephthalate via solvent dissolution under high pressure and at temperatures ranging from ambient temperature to about 250° C. The solvents deployed are aliphatic alcohols, including methyl alcohol, ethyl alcohol, normal propanol, isopropanol, and mixtures thereof.

U.S. Pat. No. 4,003,881 discloses a process of recovering polyester polymer for reuse from the discarded dyed polyester fibers by solvent dissolution and dye-stripping. The solvents deployed are para-chloroanisole; dichloromethane; nitrobenzene; 1,1,1 trichloroethane; acetophenone; trichloroacetic acid; propylene carbonate; dimethyl sulfoxide; 1,1,2,2 tetrachloroethane; 2,6-dimethyl phenol; quinoline; 1,1,1,3, 3,3 hexafluoro-isopropanol; ethylene carbonate; naphthalene; propylene carbonate; meta-cresol; chloroform; phenol; carbon tetrachloride; tetrahydronaphthalene; ortho-phenylphenol; para-phenylphenol; trifluoroacetic acid; ortho-chlorophenol; trichlorophenol; diphenyl; diphenyl ether; methyl naphthalene; benzophenone; diphenyl methane; dimethyl formamide; benzyl alcohol; para-dichlorobenzene; acenaphthene; phenanthrene; ethylene glycol; 1,2,2 trifluoroethane; and/or paradichlorobenzene.

U.S. Pat. No. 4,137,393 discloses a process representing a slight modification of U.S. Pat. No. 4,003,881. The solvents claimed include: para-chloroanisole; nitrobenzene; acetophenone; dimethyl sulfoxide; 2,6-dimethyl phenol; quinoline; naphthalene; meta-cresol; phenol; tetrahydronaphthalene; ortho-phenylphenol; para-phenylphenol; trifluoroacetic acid; ortho-chlorophenol; trichlorophenol; diphenyl; diphenyl ether; methyl naphthalene; benzophenone; diphenyl methane; dimethyl formamide; para-dichlorobenzene; diphenyl methane; acenaphthene; phenanthrene; a solvent characterized by at least one carbocyclic ring; naphthalene; diphenyl; diphenyl ether; methyl naphthalene; benzophenone; diphenyl methane; phenanthrene; acenaphthene; para-dichlorobenzene; and naphthalene.

U.S. Pat. No. 4,031,039 discloses a method for separating plastics comprising different polymers in a discarded mixture by resorting to the aforementioned selective dissolution. The solvents deployed in the examples or specifically claimed in the patent include: o-xylene; p-xylene; m-xylene; tetrahydrofuran (THF); cyclohexanone; dioxane; and methylethylketone; as well as each of said organic solvents containing water, an alcohol $C_nH_{2n+1}OH$ (wherein n=1, 2, 3 or 4), inorganic acid; organic acid, inorganic alkaline compound, or organic basic compounds, either singly or in a combination of two or more.

U.S. Pat. No. 5,198,471 discloses a method of separating plastics of different polymers in a physically commingled mixture based on the aforementioned selective dissolution. Specifically, a first plastic, or polymer, is dissolved at a lower temperature and the remaining plastics, or polymers, are dissolved sequentially at higher temperatures. The method is illustrated by examples deploying solvents including tetrahydrofuran (THF), xylene, toluene, and ethylene glycol.

U.S. Pat. No. 5,278,282 is a continuation-in-part of U.S. Pat. No. 5,198,471, mentioned above. This patent discloses a method of heating, separating and dissolving polymers from a commingled solid mixture. The solvents used include: tetrahydrofuran; toluene; xylene; N-methylpyrrolidinone; n-butanol; cyclohexanol; N, N-dimethyl acetamide; 1-methyl 2-pyrrolidinone; amyl acetate; 2(2-butoxyethoxy) ethanol; chlorobenzene; cyclohexane; cumene; decahydronaphthalene; diethyl maleate; tetrahydronapthalene; cyclohexanone; 1,2-dichlorobenzene; 2-undecanone; and mixtures thereof.

French Patent 2776663 discloses a process of recovering substantially pure polyvinyl chloride (PVC) from plastic items via solvent dissolution. The solvents deployed are methyl-ethyl-ketone (MEK), methyl-isobutyl-ketone (MIBK), and tetrahydrofuran (THF).

An exhaustive survey of available technical literature, including journal articles, conference proceedings articles, presentations, books, and monographs, has revealed wide ranging varieties of organic solvents, some of which are included in the above-mentioned patents, for dissolution of plastics. These solvents include: 1,1,2,2-tetrachloroethane; 1,2-dichlorobenzene; 1,2-dichloroethane; 1,2-dichloropropane; 1,3-dichlorobenzene; 1,3-dioxane; 1,4-dichlorobutane; 1,4-dioxane; 2-butanone; 2-methylcyclohexanone; 2-nonanone; 2-picoline; 3-methylcyclohexanone; 3-nonanone; 3-pentanone; 4-heptanone; 5-nonanone; a mixture of bromobenzene, isoamyl acetate decalin and isoamyl acetate; acetone; acetylacetone; all aliphatic alcohols; anisole; anthracene; bean oil (vegetable oils in general); benzaldehyde; benzothiopene; benzyl alcohol; benzyl chloride; bromobenzene; butyl formate; chlorobenzene; chlorofluorocarbons (CFCs); chloronaphthalene alcohol (MeOH or EtOH)+ether (dioxane, THF or dimethoxy-ethane); chorinated solvents (e.g., 1,2-dichloroethane); cyclohexanone; cyclopentane; cyclopentanone; cyclopentyl chloride; decalin; diethyl phthalate; dihydronaphthalene; diisopropyl ketone; dimethyl naphthalene; dimethyl phthalate; dimethylacetamide/diglyme (88% wt DMAC); dipropylene glycol; ethyl acetate; ethyl acetoacetate; ethylbenzene; ethylene dichloride (EDC); ethylene glycol (EG); fluorene; fluorobenzene; highly paraffinic "white" oil (e.g., recycled lubricating oil base starch); isobutyl methyl ketone; isopropethylalcohol (IPA) (propa-2-ol or 2-propanol); isopropyl acetate; isopropyl methyl ketone; isopropylbenzene; ketones in general; m-chlorotoluene; MEK with one of six non-solvents (water, methanol, ethanol, 1-propanol, 2-propanol, ethylene glycol); methyl acetate (MA); methyl acetoacetate; methyl Cellosolver® acetate; methylene chloride; methyl isobutyl ketone (MIBK); N,N-diethylaniline; N,N-dimethylaniline; N,N-dimethylformamide; naphthalene acetonitrite alcohol (methanol, ethanol, 2-propanol, 1-butanol or hexanol); N-cyclohoexyl-2-pyrrolidinone (CHP); N-ethyl-2-pyrrodinone (NEP); n-hexadecane; nitrobenzene; N-methyl-2-pyrrolidine xylene-cyclohexane mixture; N-methyl-2-pyrrolidone (NMP); o-chlorotoluene; o-xylene; pentanol; perylene; phenetole; propyl acetate; pyrene; styrene (monomer in general); tetraethylene glycol; tetrahydrofuran; tetrahydrofurfuryl alcohol; tetrahydropyran; tetralin; toluene; and toluene-methanol mixture.

Thus, a substantial number of organic solvents has been proposed for the dissolution of single-polymer or multi-polymer plastics alone or in a physically commingled mixture. Apparently, however, few of these solvents have been extensively deployed commercially. This could be attributed to one or more of the following characteristics, or properties, of such solvents: (1) highly volatile, thus entailing the dissolution to be conducted under an appreciable high pressure even at a relatively low or moderately high temperature, (2) unacceptably high toxicities and/or low flash points, (3) difficult to manufacture in mass, (4) non-recyclable, and/or (5) non-renewable.

Unconsolidated pieces of a material dissolve far faster in a liquid state than in a solid state at any given temperature, e.g., a material after and before melting, respectively, as long as they do not become consolidated as molten mass or masses upon melting, thereby reducing the surface area available for mass transfer or dissolution.

According to prior methods and apparatuses, unconsolidated plastics in various forms, e.g., powder, particles, pellets and irregularly shaped, crushed scraps, under high shearing and/or compressing forces, are melted with the aid of heating to yield a molten mass. Upon exiting from an apparatus, this molten plastic mass almost immediately solidifies, forming a consolidated, plastic object. It is inconceivable that either the molten mass or subsequently solidified object of plastic can be readily reverted back to the unconsolidated form in the dissolving solvent. Moreover, the apparatus for melting can be costly. Some examples of patents disclosing the above methods and apparatuses are: U.S. Pat. No. 4,218,146, which discloses an extruder-like apparatus to melt a thermoplastic material; U.S. Pat. No. 4,388,262, which is the modification of the preceding patent; and U.S. Pat. No. 5,240,656, which discloses an apparatus and method to melt a plastic by passing it through the controlled heating zone by gravity flow.

The solvents most commonly used in laboratories or deployed commercially for the dissolution or selective dissolution of plastics comprising polymers or other polymeric materials because of their availability include: acetone; hexane; methanol; ethanol; butanol(s), propanol(s), hexanol(s); ethylene dichloride (EDC); tetrahydrofuran (THF); toluene; xylene(s); cumene; cyclohexane; and ethylene glycol. The boiling points of these solvents range from 56° C. for acetone to 197° C. for ethylene glycols. These boiling points are within the range of about 100° C.±60° C. except that of ethylene glycol, and thus, they are unsuitable for melting plastics under ambient or near ambient pressure. The melting points of the majority of discarded plastics that are recycled, including polyvinyl chloride (PVC), polystyrene (PS), low density polyethylene (LDPE), high density polyethylene (HDPE), polypropylene (PP), and polyethylene terephthalate (PET), are within about the same temperature range as that of the boiling points of these solvents or somewhat higher.

SUMMARY OF INVENTION

The present invention relates to compositions and methods for the dissolution, dissolution via melting, selective dissolution via melting or decomposition of plastics comprising polymers, or co-dissolution of plastics comprising polymers with one or more fossil fuels. A plastic comprising a single polymer is dissolved with a turpentine liquid at any temperature below, equal to, or exceeding the plastic's melting point. Commingled plastics comprising various polymers are separated into individual plastics, each comprising a single polymer, by selectively dissolving the plastics in a turpentine liquid by melting. A plastic comprising polyvinyl chloride or a thermosetting polymer, e.g., epoxy resin, is decomposed by heating it in a turpentine liquid. A plastic comprising a polymer is co-dissolved with one or more fossil fuels by heating in a turpentine liquid. The turpentine liquid is selected from the family of turpentine liquids.

DETAILED DESCRIPTION OF A PREFERRED EMBODIMENT

An aspect of the present invention includes compositions and methods of using compositions containing plastic dissolving and/or decomposing liquids selected from the family of turpentine liquids, which are recyclable, low in toxicity, low in volatility, often renewable, and mass-producible; and thus, are appreciably less expensive and/or more suitable than any other known solvent for the dissolution, dissolution via melting, selective dissolution or decomposition of plastics comprising polymers, or co-dissolution of plastic comprising polymers with fossil fuel. According to the inventive method, a plastic material is contacted with a plastic dissolving and/or decomposing composition at a ratio of greater than about 1:1 of said plastic-decomposing composition to said plastic material, preferably at a ratio of about 2:1 to about 5:1.

The plastic dissolving and/or decomposing composition comprises a turpentine liquid. In one embodiment, the plastic dissolving and/or decomposing composition comprises at least about 0.01%, preferably at least about 0.1%, and even more preferably at least about 1% of said turpentine liquid. In other embodiments, the plastic dissolving and/or decomposing composition consists essentially of or consists of at least one turpentine liquid.

According to an aspect of the invention, the turpentine liquid comprises, consists essentially of, or consists of one or more of turpentine liquids selected from the group consisting of natural turpentine, synthetic turpentine, mineral turpentine, pine oil, alpha-pinene, beta-pinene, alpha-terpineol, beta-terpineol, gamma-terpineol, 3-carene, anethole, dipentene (p-mentha-1,8-diene), terpene resins, alpha-terpene, beta-terpene, gamma terpene, nopol, pinane, camphene, p-cymene, anisaldehyde, 2-pinane hydroperoxide, 3,7-dimethyl-1,6-octadiene, isobornyl acetate, terpin hydrate, ocimene, 2-pinanol, dihydromyrcenol, isoborneol, alloocimene, alloocimene alcohols, geraniol, 2-methoxy-2,6-dimethyl-7,8-epoxyoctane, camphor, p-menthan-8-ol, alpha-terpinyl acetate, citral, citronellol, 7-methoxydihydrocitronellal, 10-camphorsulphonic acid, p-menthene, p-menthan-8-yl acetate, citronellal, 7-hydroxydihydrocitronellal, menthol, menthone, polymers thereof, and mixtures thereof.

The plastic dissolving and/or decomposing composition is said to consist essentially of the turpentine liquid if the turpentine liquid is the essential active ingredient for substantially all of the plastic dissolution and/or decomposition and other ingredients in the composition are essentially inactive or non-active in decomposition. Thus, in certain embodiments, the basic and novel characteristics of the present invention include a composition consisting essentially of a turpentine liquid that excludes other active plastic dissolution and/or decomposition ingredients.

In one embodiment, the inventive method substantially reduces the amount of polymer or polymers in a plastic sample to be dissolved and/or decomposed. As used herein, the term "substantially reduces" shall mean the weight of the plastic sample is reduced by at least about 30% as compared to the weight of the plastic sample before contacting with turpentine liquid.

Preferably, the weight of the plastic sample is reduced by at least about 50%, and yet more preferably, the weight of the plastic sample is reduced by at least about 70% as compared to weight of the plastic sample before contacting with turpentine liquid. Even more preferably, the entire plastic sample is dissolved or decomposed in the turpentine liquid.

According to a preferred aspect of the invention, the turpentine liquid is one or more liquids selected from the group consisting of natural turpentine, synthetic turpentine, mineral turpentine, pine oil, alpha-pinene, beta-pinene, alpha-terpineol, beta-terpineol, polymers thereof, and mixtures thereof. In a preferred embodiment, the turpentine liquid comprises about 40 to 60% α-terpineol, about 30 to 40% β-terpineol, about 5 to 20% β-pinene, and about 0 to 10% p-cymene. In another preferred embodiment, the turpentine liquid comprises about 40 to 60% α-terpineol or β-terpineol, about 5 to 40% α-pinene or β-pinene, and about 0 to 20% p-cymene.

According to an aspect of the present invention, a solvent, i.e., a second liquid can be added to the turpentine liquid. According to a certain aspect of the invention, the second liquid can be selected from lower aliphatic alcohols, alkanes, aromatics, aliphatic amines, aromatic amines, carbon bisulfide, vegetable oils, and mixtures thereof. Exemplary mixtures include solvents manufactured in petroleum refining, such as decant oil, light cycle oil and naphtha, or solvents manufactured in dry distilling coal and fractionating liquefied coal, or solvents manufactured in fractionating extracted hydrocarbons from oil (tar) sands and oil shale.

As used herein, lower aliphatic alcohols refer to primary, secondary and tertiary monohydric and polyhydric alcohols of between 2 and 12 carbon atoms. As used herein, alkanes refer to straight chain and branched chain alkanes of between 5 and 22 carbon atoms. As used herein, aromatics refer to monocyclic, heterocyclic and polycyclic compounds. As used herein, aliphatic amines refer to primary, secondary and tertiary amines having alkyl substituents of between 1 and 15 carbon atoms. In certain embodiments, the lower aliphatic alcohols noted above can be used. In one embodiment, the solvent is selected from ethanol, propanol, isopropanol, butanol, pentane, heptanes, hexane, benzene, toluene, xylene, naphthalene, anthracene, tetraline, triethylamine, aniline, carbon bisulfide, and mixtures thereof, at a temperature and pressure operable to maintain the solvent in liquid form.

According to a certain aspect of the present invention, a second fluid that can be added to a turpentine liquid can be selected from solvents for plastic dissolution disclosed in segments [0006] through [0013] and mixtures thereof.

In certain embodiments, the ratio of turpentine liquid to any other second liquid contained in the plastic-decomposing composition is greater than or equal to 1:1, in certain embodiments greater than or equal to about 9:4. In certain embodiments, the ratio is greater than or equal to about 3:1. In yet other embodiments, the ratio is greater than or equal to 4:1.

An aspect of the present invention is a method for the dissolution of a plastic comprising a single polymer comprising, consisting essentially of, or consisting of the step of contacting the plastic with a turpentine liquid at any temperature not exceeding the melting point of the plastic, at such temperatures that the turpentine liquid remains stable. For example, at temperatures below about 250° C., preferably at a temperature between about 60° C. and about 200° C. The method can be performed under any pressure, preferably under ambient or near ambient pressure between about $1 \times 10^4$ Pascals (0.1 atm) and about $10 \times 10^5$ Pascals (10 atm). In the inventive method, unconsolidated pieces of said plastic in various forms can be dissolved by heating in a turpentine liquid, which is not boiling, or boiling with no, partial, or total reflux. The polymer in the turpentine liquid, resulting from the dissolution of said plastic, is recovered from the solution by a flash evaporation technique or is separated from the solution by any of the available techniques for extracting a polymer from a solution. For example, such methods are described in detail in U.S. Pat. No. 5,278,282 by Nauman et al. and U.S. Pat. No. 7,569,658 by Vandenhende et al., which are incorporated herein by reference. When desirable or necessary, fillers such as impact modifiers and stabilizers are added to the solution prior to the recovery or separation of the polymer.

An aspect of the present invention discloses a method for the dissolution via melting of a plastic comprising a single polymer with a turpentine liquid at any temperature at which the turpentine liquid remains stable, e.g., below about 250° C., and under any pressure, preferably at a temperature between about 60° C. and about 200° C., and under ambient or near ambient pressure between about $1\times10^4$ Pascals (0.1 atm) and about $10\times10^5$ Pascals (10 atm). Unconsolidated pieces of plastic in various forms are heated in a turpentine liquid, which is not boiling, or boiling with no, partial or total reflux, above said plastic's melting point, which is followed essentially simultaneously by the dissolution of such pieces of said plastic into said turpentine liquid. As such, the rate of plastic dissolution is substantially accelerated because the separate pieces of the melted plastic remain unconsolidated without forming a molten mass or masses of larger size, thereby reducing the surface areas available for dissolution. The polymer in the turpentine liquid resulting from the dissolution via melting of the plastic is recovered from the solution by a flash evaporation technique or separated from the solution by any of the available techniques for extracting a polymer from a solution (as described in the previous paragraph). When desirable or necessary, fillers such as impact modifiers and stabilizers are added to the solution prior to the recovery or separation of the polymer.

Another embodiment of the present invention is a method for selective dissolution and melting for separating physically mixed or commingled plastics comprising various polymers into individual plastics, each made up of a single polymer, the method comprising, consisting essentially of, or consisting of contacting the plastic with a turpentine liquid. The method can be performed under any pressure, preferably under ambient or near ambient pressure between about $1\times10^4$ Pascals (0.1 atm) and about $10\times10^5$ Pascals (10 atm). A mixture of physically commingled plastics comprising various polymers is heated in a turpentine liquid serving as the solvent at least to a temperature appreciably greater than the melting point of a first plastic having the lowest melting point, causing this first plastic to melt and dissolve. The temperature at this step of the method is kept less than the melting point of any of the other plastics to be selectively dissolved. The remaining mixture of plastics is separated from the turpentine liquid, transferred to a fresh batch of turpentine liquid, which may be the same or different from the first batch, and heated to a temperature greater than the melting point of a second plastic, having the second lowest melting point in the original mixture of plastics, to cause this second plastic to melt and dissolve. These steps are repeated until all the plastics are separated. The temperature to which the solvent is heated at each step depends on the difference in the melting points and solubilities of the plastics in the mixture, the difference in the melting points and solubilities of each successive pair of plastics, the speed of separation desired, and the extent of separation of the plastics desired. Any of the polymers in the turpentine liquid successively resulting from the selective dissolution via melting for separating plastics can be recovered from the solution by a flash evaporation technique or by any of the available techniques for extracting a polymer from a solution. When desirable or necessary, fillers, such as impact modifiers and stabilizers, are added to the solution prior to the recovery or separation of the polymer.

In another embodiment of the invention, the turpentine liquid is selected from turpentine liquids with relatively high boiling points. Preferably, the turpentine liquid is alpha-terpineol, beta-terpineol or a mixture thereof, whose boiling point under ambient pressure is greater than the melting points of the majority of discarded plastics listed in segment [0017]. If necessary or desired, this boiling point can be elevated with pressurization.

An aspect of the present invention is a method for removing and separating stabilizers, impact modifiers and various other materials, such as clays, glass beads, cellulosic fibers, and metallic pieces, which are imbedded in plastics as fillers or commingled with plastics as impurities. The method includes the step of heating the plastics to or above their melting points in a turpentine liquid. Upon melting, the plastics release fillers and/or impurities into the turpentine liquid, which is non-viscous, without forming sludge with melted plastics. The fillers and/or impurities can be removed from the turpentine liquid by any of the conventional methods for liquid-solid separation, e.g., hydrocycloning, sieving, sedimentation, flotation, filtration, and centrifugation. If necessary or desired, these fillers and/or impurities can be separated into individual ingredients for recycling by sequentially deploying one or more of the above-mentioned or otherwise known separation methods.

An aspect of the present invention discloses a method for the preparation of a mixture of two or more polymers micro-dispersed at the molecular scale from which a plastic comprising a polymer blend or an interpenetrating polymer composite is fabricated. Two or more physically mixed or commingled plastics comprising various polymers are heated, melted, and dissolved in a turpentine liquid under ambient or near ambient pressure between about $1\times10^4$ Pascals (0.1 atm) and about $10\times10^5$ Pascals (10 atm). After removing insoluble impurities as disclosed in the preceding paragraph, the resultant mixture of the polymers in the turpentine liquid is removed from the solution, which is nonviscous, by a flash evaporation technique or by any of the available techniques for extracting polymers from a solution. This is followed by pelletizing the resultant mixture of polymers. High quality plastics, each comprising a polymer blend of two or more polymers microdispersed at the molecular scale, are obtained by molding the manufactured pellets with an extruder, injection molder, blow molder, or any other suitable molding machine. When desirable or necessary, fillers, e.g., impact modifiers and stabilizers, are added to the solution prior to the recovery or separation of the mixture of polymers. Alternatively, the resultant mixture of polymers is incorporated into a polymer with network micro-structure, e.g., animal hide or textile, and cured via compression and heating to fabricate an interpenetrating polymer composite.

An aspect of the present invention discloses a method for the dechlorination (or dehydrochlorination) of a plastic material containing chloride, by heating it in a turpentine liquid without the aid of any reagent to the decomposition temperature of the plastic material.

In one embodiment, the present invention is a method for the dechlorination (or dehydrochlorination) of a plastic comprising poly(vinyl chloride) (PVC), comprising, consisting essentially of, or consisting of the step of heating PVC in a turpentine liquid without the aid of any reagent to the decomposition temperature of the plastic material. For PVC, this temperature is in the range of between about 170° C. and about 230° C., under ambient or near ambient pressure between about $1 \times 10^4$ Pascals (0.1 atm) and about $10 \times 10^5$ Pascals (10 atm). The decomposition of PVC, thus giving rise to its dechlorination (or dehydrochlorination) and the formation of polyenes, $(C_2H_2)_n$, is evident from the release of HCl with its characteristic penetrating odor, bubbling upward through said turpentine liquid. Polyenes, which have a variety of uses, are recovered by any conventional method for separating polymeric material from the solvent, e.g., flash evaporation. [See, e.g., Wakimoto, K., H. Toyota, Y.-I. Uchida, Y. Tomii, and M. Iwase, "Thermal Decomposition of Polyvinyl Chloride for the Removal of Chlorine," *High Temp. Mater. Process.*, 21, 237-242 (2002).]

An aspect of the present invention discloses a method for the decomposition of a thermosetting plastic, e.g., epoxy resin, by heating it in a turpentine liquid, without the aid of any reagent and/or catalyst, to a decomposition temperature of the plastic comprising a thermosetting polymer, e.g., about 120° C. or higher for epoxy resin, but below about 250° C. Within this temperature range, the turpentine liquid remains stable under any pressure. Preferably the method is performed under ambient or near ambient pressure, between about $1 \times 10^4$ Pascals (0.1 atm) and about $10 \times 10^5$ Pascals (10 atm).

An aspect of the present invention discloses a method of co-dissolving, or co-liquefying, a plastic or plastics with a fossil fuel, e.g., coal, oil (tar) sands or oil shale, by heating in a turpentine liquid without the aid of any reagent and/or catalyst at a temperature below about 250° C., at which said turpentine liquid remains stable, and under ambient or near ambient pressure between about $1 \times 10^4$ Pascals (0.1 atm) and about $10 \times 10^5$ Pascals (10 atm). After separating the solid residue, the resultant mixture can be conveyed to a refinery or any crude oil upgrading facility as a feedstock where the turpentine liquid is recovered for recycling. The remaining enriched crude oil is hydrocracked at the early stages of the refinery or upgrading facility where the polymer or polymers of dissolved plastic or plastics are decomposed, thereby yielding additional hydrocarbons.

In one embodiment, the plastic to be decomposed is physically manipulated before contacting with the plastic decomposing composition. For example, the plastic can be crushed, cubed, pelleted, and/or shredded.

EXAMPLES

Example 1

In this example, about 2 grams of nearly spherical, rigid low-density polyethylene (LDPE) pellets with a diameter of about 0.42 centimeters and a specific gravity of about 0.92 were dissolved in about 40 grams of alpha-terpineol serving as the solvent at about 100° C., which is slightly below the average melting point of LDPE, and under ambient pressure in a graduated glass bottle. The bed of LDPE pellets floating at the top portion of the solvent was agitated manually by shaking the bottle every several minutes. At about 19 minutes, swelling and softening of the LDPE pellets were detected by pressing them to the wall of the bottle with a hand-held metal rod; moreover, blurring of the boundary between the solvent and the bed of LDPE pellets was observed. At about 29 minutes, the LDPE pellets were clearly observed to start disappearing. The LDPE pellets were hardly distinguishable from the solvent after about 41 minutes, thereby indicating their total dissolution into the solvent to form a homogeneous, transparent solution.

Example 2

In this example, about 40 grams of nearly spherical, rigid polypropylene (PP) pellets with a diameter of about 0.46 centimeters and a specific gravity of about 0.87 grams per milliliter were dissolved in about 120 grams of alpha-terpineol serving as the solvent at about 177° C. and under ambient pressure in a graduated glass bottle. The bed of PP pellets floating at the top portion of the solvent was agitated manually by shaking the bottle every several minutes. At about 15 minutes, swelling and softening of the PP pellets were detected by pressing them to the wall of the bottle with a hand-held metal rod; moreover, blurring of the boundary between the solvent and the bed of PP pellets was observed. At about 35 minutes, the PP pellets started forming an opaque, viscous mixture, which eventually became transparent and indistinguishable from the solvent at about 55 minutes, thus indicating complete dissolution. The melting point of PP is about 160° C., thereby indicating that the dissolution of PP pellets by heating at 177° C. was accelerated by melting: Visual observations of the depth of the bed indicated that the PP pellets hardly dissolved in alpha-terpineol at the ambient temperature ranging between 15 and 24° C. and under ambient pressure even after 2 days. Moreover, as can be discerned from the results of other examples (Examples 4 and 5) in which only about 2.5 grams of PP were dissolved in about 100 grams of alpha-terpineol (ratio of 1:40) at about 150° C., instead of about 40 grams of PP in about 120 grams of alpha-terpineol (ratio of 1:2.5) at about 177° C. as in this example, about 71 minutes were required for the mixture of PP pellets and alpha-terpineol to become gradually transparent, which eventually transformed to a totally transparent liquid at about 139 minutes.

Example 3

In this example, about 5 grams of low-density polyethylene (LDPE) pellets as described in Example 1 were dissolved in about 100 grams of alpha-terpineol serving as the solvent at about 177° C. and under ambient pressure in a graduated glass bottle. The bed of LDPE pellets floating at the top portion of the solvent was agitated manually by shaking the bottle every several minutes. At about merely 2 minutes, the LDPE pellets started forming an opaque, viscous mixture, which eventually became nearly indistinguishable from the solvent at about 11 minutes. At about 36 minutes, the mixture became totally transparent, thus signifying that the LDPE pellets totally dissolved in the solvent. The melting point of LDPE is about 115° C., thereby indicating that the dissolution of LDPE pellets by heating at 177° C. was accelerated by melting. In contrast, visual observations of the depth of the bed indicated that the LDPE pellets did not dissolve or swell in alpha-terpineol at about 80° C. or at ambient temperature ranging between 15 and 24° C. and under ambient pressure even after 2 days.

Example 4

About 2.5 grams of low-density polyethylene (LDPE) pellets, as described in Example 1, and about 2.5 grams of polypropylene (PP) pellets. as described in Example 2. were selectively contacted with about 100 grams of alpha-terpineol serving as the solvent at about 150° C., which is higher than LDPE's melting point of about 115° C., but lower than PP's melting point of about 160° C., and under ambient pressure in a graduated glass bottle. Due to the substantial difference in their sizes, the pellets of the two plastics were clearly visually distinguishable. Moreover, a distinct separation between the plastics and solvent was observed at the outset. After about 9 minutes of contacting, the LDPE pellets started forming an opaque, viscous mixture in the solvent, whereas the PP pellets remained essentially unchanged according to visual observations. At about 14 minutes, this opaque mixture became essentially transparent, and the LDPE pellets in it were essentially completely dissolved, but the PP pellets remained unchanged, thereby unequivocally indicating that various plastics can be clearly segregated based on differences in melting points.

Example 5

This example is a continuation of EXAMPLE 4 involving both LDPE and PP pellets. After about 17 minutes of contacting, the PP pellets and solvent started to form an opaque, viscous mixture. After about 71 minutes of contacting, the mixture became increasingly transparent, indicating the onset of the complete dissolution of PP pellets into the solvent. After about 139 minutes of contacting, the entire mixture was transparent, signifying the generation of a homogeneous solution containing both LDPE and PP, which can be separated from the solvent by any of the available techniques, e.g., flash evaporation. By suitably molding this solution, a resulting mixture of LDPE and PP will yield a high-quality polymer alloy in which LDPE and PP are micro-dispersed at the molecular scale. The mixture can also be incorporated into a polymer with network micro-structure, e.g., animal hide, to yield an interpenetrating polymer composite.

Example 6

In this example pertaining to polyvinyl chloride (PVC), 4 experiments were conducted.

In the first experiment, about 15 grams of PVC powder with a particle size of about 0.0119 centimeters and a specific gravity of about 1.4 were contacted with about 47 grams of alpha-terpineol serving as the solvent at about 177° C., which is higher than PVC's melting point of around 130-150° C., and under ambient pressure in a graduated glass bottle. The temperature of 177° C. is within the range of PVC's decomposition temperature of around 170° C. to 230° C. The PVC powder settled at the bottom of the bottle, forming a bed with a bulk volume of about 24 milliliters, which was agitated manually by shaking the bottle every several minutes. After about 14 minutes of contacting, the PVC powder started to change color from whitish to yellowish and its bulk volume swelled to about 55 milliliters. After about 22 minutes of contacting, the evolution of small bubbles of irritating gas, presumably HCl from the decomposition of PVC powder, was observed. The boundary between the PVC powder and the solvent became essentially indistinguishable and the reaction mixture became brownish in color and highly viscous. The decomposition of PVC not only releases HCl but also leaves polymers $(C_2H_2)_n$ in the solution. After about 30 minutes of contacting, the boundary disappeared completely in the amber and highly viscous resultant mixture. The total volume of the mixture became about 65 milliliters, an indication of mass loss due to the evolution of HCl.

The essential aspects of the results of the first experiment were confirmed in the second experiment, which was performed according to the experimental setup in the first experiment, at the same temperature and under the same pressure, but with 70% more solvent. After about 33 minutes of contacting, the resultant mixture was amber in color, but much less viscous than the mixture obtained in the first experiment. This is probably attributable to the nearly 70% increase in the amount of solvent used.

In the third experiment, a mixture containing about 0.4 grams of PVC powder and about 5.9 grams of alpha-terpineol serving as the solvent was heated at about 150° C., which is equal to or exceeds slightly the PVC's melting point of 130-150° C. Almost immediately after the initiation of the experiment, the color of PVC powder turned to slightly brownish. After about 17 minutes of contacting, no distinguishable interface between the powder and solvent and no gas bubbling was observed, thereby signaling the complete dissolution of PVC, possibly via melting but without decomposition. Thereafter, the mixture remained transparent without stirring and became opaque and brownish upon stirring. Moreover, visual observation and the extent of the ease of stirring indicated that the mixture was far less viscous than the mixture obtained in the first experiment because of the nearly five-fold increased amount of the solvent.

In the fourth experiment, a mixture comprising about 16 grams of PVC powder and about 67 grams of alpha-terpineol was heated at about 160° C., which is between the melting and decomposition temperature of PVC, and under ambient pressure. The PVC powder appeared to start dissolving via melting after about 13 minutes of contacting. By about 18 minutes after contacting, the mixture transformed into a gel-like, viscous mass, which became clear with only some spots exhibiting brownish color at about 21 minutes. Visual observation and the extent of ease of stirring indicated that the mixture's viscosity decreased continuously thereafter, and its color became yellowish with some brownish spots at about 25 minutes. At about 33 minutes, the mixture became uniformly brownish in color and fairly fluid. No gas bubbles were observed throughout the process.

Example 7

In this example pertaining to relatively low-temperature thermal decomposition of epoxy resin, three experiments were carried out with pellets of the widely marketed epoxy resin, LOCTITE®.

In the first experiment, about 8.9 grams of large epoxy pellets were heated in about 31.3 grams of alpha-terpineol at about 150° C. and under ambient pressure in a graduated glass bottle. The pellets settled at the bottle's bottom. The large epoxy pellets were dome-shaped and of irregular size with the projected average diameter of about 1.14 centimeters. At about 49 minutes, most of the pellets as well as the solvent became yellow/brown in color, which remained so until about 663 minutes when the experiment was terminated. No gas bubbling was observed throughout the experiment, thereby indicating that the pellets underwent only slight decomposition as implied by their color change.

In the second experiment, about 8.4 grams of large epoxy pellets, as described above for the first experiment, were heated in about 34.9 grams of alpha-terpineol at about 200° C. The dissolution and/or decomposition mixture was observed continuously and the following observations were made. At about 3 minutes, some pellets turned brownish in color and gas began to bubble, indicative of pellet decomposition. At about 5 minutes, gas bubbling became fairly vigorous with an appreciable number of the pellets changing to a brownish color. At about 15 minutes, gas bubbling became more vigorous and most of the pellets turned brownish. The entire mixture became extremely brownish by about 150 minutes, accompanied by continued intense bubbling of gas. These conditions persisted for about another 120 minutes at which point the intensity of gas bubbling decreased. The experiment was terminated at about 1,265 minutes. The total volume of the mixture of alpha-terpineol and epoxy pellets remained very roughly at 40 milliliters throughout the experiment. Furthermore, the changes in the pellets' size and shape could not be discerned visually. On the other hand, the overall dry weight of the pellets decreased from about 8.4 grams to about 7.8 grams corresponding to the reduction of about 0.6 grams or equivalently about 7.14 wt %, which is small but statistically significant. This reduction in the weight could be attributed to the evolution of gaseous decomposition product of epoxy pellets, presumably a mixture of various aldehydes, as could be sensed by its piercing, acrid odor and also possibly by leaching of some non-gaseous decomposition products, e.g., bisphenol A (BHA) and one or more phenol compounds.

In the third experiment, about 0.2 grams of small epoxy pellets were heated in about 3.1 grams of alpha-terpineol at about 200° C. The small epoxy pellets were also dome-shaped and of irregular size with the projected average diameter of about 0.46 centimeters. The dissolution and/or decomposition mixture was observed continuously and the following observations were made. At about 2 minutes, the pellets turned slightly yellowish/brownish. At about 9 minutes, gas bubbling was initiated, which continued until about 100 minutes with some pellets turning significantly more yellowish/brownish. At about 128 minutes, even the color of liquid became very brownish. At about 203 minutes, an appreciable decrease in the liquid was observed, with the pellets and liquid remaining dark brownish and gas bubbling continuing. At about 232 minutes, the experiment was temporarily suspended: The liquid was nearly totally spent due to its absorption into the pores of epoxy pellets and evaporation promoted by gas bubbling. This is entirely unlike the second experiment with large pellets for which the volume change of the mixture including the liquid was hardly observable. The experiment was resumed after the addition of about 4.0 grams of alpha-terpineol, and continued for an additional period of about 151 minutes with gas bubbling continuing and the entire mixture remaining very dark brown in color. The total period of the experiment was about 383 minutes, which was appreciably shorter than about 1,265 minutes spent for the second experiment with the large pellets. The overall dry weight of the small pellets decreased from about 0.2 grams to about 0.1 gram for a loss of about 50.0 wt %. This substantial decrease in weight in a much shorter time may explain the appreciable reduction in the liquid due to its absorption into the pores of epoxy pellets and evaporation promoted by gas bubbling. Also, the size effect expected of the heterogeneous chemical reaction involving both liquid and solid was obvious from the results.

Example 8

In this example for demonstrating co-dissolution, i.e., co-liquefaction, of fossil fuel and plastic, about 15 grams (bulk volume of about 10 milliliters) of high-grade Alberta oil (tar) sands with tar content of about 13.48% and about 15 grams (bulk volume of about 7 milliliters) of low-density polyethylene (LDPE) pellets as described in EXAMPLE 1 were mixed with about 60 grams (volume of about 65 milliliters) of alpha-terpineol serving as the solvent at about 160° C. under ambient pressure in a graduated glass bottle. This temperature of 160° C. is higher than the LDPE's melting point of 100-120° C. The dissolution of tar in the oil (tar) sands began immediately after the initiation of the experiment as evident from darkening of the solvent, although 3 distinct layers with the total volume of about 82 milliliters could still be observed. These 3 layers were made up of oil (tar) sands settling at the bottom, solvent occupying the middle, and LDPE pellets floating at the top. The dissolution and/or decomposition mixture was observed continuously and the following observations were made. After about 1 minute, the total volume of the mixture increased from about 82 milliliters to about 85 milliliters probably due to the additional dissolution of tar as evidenced by the increased darkening of the solvent and the onset of the melting of LDPE pellets, which was evident from the pellets' tendency to adhere to the bottle's wall. At about 3 minutes, the solvent became very dark, signaling essentially total extraction of tar. Meanwhile, LDPE pellets started to form a gel-like viscous mass, signaling the end of melting and the beginning of dissolution. The total volume of the mixture was about 90 milliliters at about 11 minutes instead of 85 milliliters at 1 minute. This increase in the volume could be attributed mainly to dissolution of the melted LDPE. In fact, the gel-like mass of LDPE disappeared and clean sands were observed at the bottle's bottom, thereby indicating the completion of co-dissolution, i.e., co-liquefaction, of tar in oil (tar) sands and LDPE pellets. The total volume of the mixture remained at about 90 milliliters for the remainder of the experiment. Visual inspection of the sands did not reveal any trace of tar, thus ascertaining that the extraction of tar was essentially total.

The invention claimed is:

1. A method of treating a material selected from the group consisting of polyvinyl chloride (PVC), polyethylene terephthalate (PET), and mixtures thereof, said method of treating selected from the group consisting of dissolving, dissolving via melting, selective dissolving, and decomposing said material comprising the steps of contacting said material with a plastic dissolving and/or decomposing composition comprising a turpentine liquid to form a dissolution and/or decomposition mixture, wherein said material is contacted with said plastic dissolving and/or decomposing composition at a ratio of greater than 1:1 of said plastic dissolving and/or decomposing composition to said material, wherein said turpentine liquid is selected from the group consisting of synthetic turpentine, mineral turpentine, alpha-terpineol, beta-terpineol, gamma-terpineol, 3-carene, anethole, nopol, pinane, camphene, p-cymene, anisaldehyde, 2-pinane hydroperoxide, 3,7-dimethyl-1,6-octadiene, isobornyl acetate, terpin hydrate, ocimene, 2-pinanol, dihydromyrcenol, isoborneol, alloocimene, alloocimene alcohols, geraniol, 2-methoxy-2,6-dimethyl-7,8-epoxyoctane, camphor, p-menthan-8-ol, alpha-terpinyl acetate, citral, citronellol, 7-methoxydihydrocitronellal, 10-camphorsulphonic acid, p-menthene, p-menthan-8-yl acetate, citronellal, 7-hydroxydihydrocitronellal, menthol, menthone, polymers thereof, and mixtures thereof, and further comprising the step of recovering said material from said composition.

2. The method of claim 1, wherein the weight of said plastic material is substantially reduced as compared to weight of said plastic sample before treatment with said plastic dissolution and/or decomposing composition.

3. The method of claim 1, wherein said composition comprises greater than about 0.01% of said turpentine liquid.

4. The method of claim 3, wherein said composition comprises greater than about 0.1% of said turpentine liquid.

5. The method of claim 4, wherein said composition comprises about 1% of said turpentine liquid.

6. The method of claim 2, wherein the weight of said material is reduced by at least about 30%.

7. The method of claim 6, wherein the weight of said material is reduced by at least about 50%.

8. The method of claim 7, wherein the weight of said material is reduced by at least about 70%.

9. A method of treating a material selected from the group consisting of polyvinyl chloride (PVC), low density polyethylene (LDPE), high density polyethylene (HDPE), polypropylene (PP), polyethylene terephthalate (PET), and mixtures thereof, said method of treating selected from the group consisting of dissolving, dissolving via melting, selective dissolving, and decomposing said material comprising the steps of contacting said material with a plastic dissolving and/or decomposing composition comprising a turpentine liquid to form a dissolution and/or decomposition mixture, wherein said material is contacted with said plastic dissolving and/or decomposing composition at a ratio of greater than 1:1 of said plastic dissolving and/or decomposing composition to said material, wherein said turpentine liquid is selected from the group consisting of alpha-terpineol, beta-terpineol, gamma-terpineol, 3-carene, anethole, nopol, pinane, camphene, p-cymene, anisaldehyde, 2-pinane hydroperoxide, 3,7-dimethyl-1,6-octadiene, isobornyl acetate, terpin hydrate, ocimene, 2-pinanol, dihydromyrcenol, isoborneol, alloocimene, alloocimene alcohols, geraniol, 2-methoxy-2,6-dimethyl-7,8-epoxyoctane, camphor, p-menthan-8-ol, alpha-terpinyl acetate, citral, citronellol, 7-methoxydihydrocitronellal, 10-camphorsulphonic acid, p-menthene, p-menthan-8-yl acetate, citronellal, 7-hydroxydihydrocitronellal, menthol, menthone, polymers thereof, and mixtures thereof, and further comprising the step of recovering said material from said composition.

10. The method of claim 1, wherein said composition further comprises a second liquid.

11. The method of claim 1, wherein said composition further comprises a second liquid selected from the group consisting of lower aliphatic alcohols, alkanes, aromatics, aliphatic amines, aromatic amines, carbon bisulfide, vegetable oils, solvents manufactured in petroleum refining, dry distilling coal, fractionating liquefied coal, and fractionating extracted hydrocarbons from oil sands and oil shale, and mixtures thereof.

12. The method of claim 11, wherein said solvent is selected from decant oil, light cycle oil, naphtha, or combinations thereof.

13. A method of treating a material selected from the group consisting of polyvinyl chloride (PVC), polyethylene terephthalate (PET), and mixtures thereof, said method of treating selected from the group consisting of dissolving, dissolving via melting, selective dissolving, and decomposing said material comprising the steps of contacting said material with a plastic dissolving and/or decomposing composition comprising a turpentine liquid to form a dissolution and/or decomposition mixture, wherein said material is contacted with said plastic dissolving and/or decomposing composition at a ratio of greater than 1:1 of said plastic dissolving and/or decomposing composition to said material, wherein said turpentine liquid comprises
about 40 to 60% α-terpineol,
about 30 to 40% β-terpineol,
about 5 to 20% β-pinene, and
about 0 to 10% p-cymene, and further comprising the step of recovering said material from said composition.

14. A method of treating a material selected from the group consisting of polyvinyl chloride (PVC), polyethylene terephthalate (PET), and mixtures thereof, said method of treating selected from the group consisting of dissolving, dissolving via melting, selective dissolving, and decomposing said material comprising the steps of contacting said material with a plastic dissolving and/or decomposing composition comprising a turpentine liquid to form a dissolution and/or decomposition mixture, wherein said material is contacted with said plastic dissolving and/or decomposing composition at a ratio of greater than 1:1 of said plastic dissolving and/or decomposing composition to said material, wherein said turpentine liquid comprises
about 40 to 60% α-terpineol or β-terpineol,
about 5 to 40% α-pinene or β-pinene, and
about 0 to 20% p-cymene, and further comprising the step of recovering said material from said composition.

15. The method of claim 1, wherein said material comprises at least one of a thermoplastic and a thermosetting polymer.

16. The method of claim 1, further comprising the step of heating said dissolution and/or decomposition mixture.

17. The method of claim 16, where said heating is at a temperature that the turpentine liquid remains stable.

18. The method of claim 17, wherein said temperature is below about 250° C.

19. The method of claim 18, wherein said temperature is between about 60° C. and about 200° C.

20. The method of claim 1, wherein said method is performed under ambient or near ambient pressure.

21. The method of claim 20, wherein said pressure is between about $1 \times 10^4$ Pascals (0.1 atm) and about $10 \times 10^5$ Pascals (10 atm).

22. The method of claim 1, wherein said turpentine liquid is not boiling.

23. The method of claim 1, wherein said turpentine liquid is boiling.

24. The method of claim 23, wherein said turpentine liquid is boiling with no reflux.

25. The method of claim 23, wherein said turpentine liquid is boiling with partial reflux.

26. The method of claim 23, wherein said turpentine liquid is boiling with total reflux.

27. The method of claim 1, further comprising the step of obtaining one or more polymers from said material dissolved in said composition.

28. The method of claim 1, wherein said recovery step is performed by flash evaporation.

29. The method of claim 28, further comprising adding impact modifiers and/or stabilizers to the reaction mixture prior to said recovery step.

30. The method of claim 1, wherein said plastic material comprises a single polymeric material.

31. The method of claim 9, wherein said material contains a mixture of a plurality of physically commingled plastics selected from the group consisting of polyvinyl chloride (PVC), low density polyethylene (LDPE), high density polyethylene (HDPE), polypropylene (PP), polyethylene terephthalate (PET), and a combination thereof.

32. The method of claim 31, wherein at least one of said plastics comprises at least two different polymers.

33. The method of claim 32, wherein said plastics are separated sequentially, the method comprising at least two contacting and heating steps.

34. The method of claim 33, wherein said dissolution and/or decomposition mixture is heated to at least to a temperature appreciably greater than the melting point of a first plastic having the lowest melting point, but less than the melting point of any other plastics contained in said plastic material.

35. The method of claim 34, wherein exclusively said first plastic becomes dissolved in said dissolution and/or decomposition mixture and a remaining plastic material remains in solid form.

36. The method of claim 35, further comprising separating said remaining plastic material from said dissolution and/or decomposition mixture, transferring said remaining plastic material to a second plastic dissolving and/or decomposing composition to form a second dissolution and/or decomposition mixture, and heating said second dissolution and/or decomposition mixture to a temperature greater than the melting point of a second plastic contained in said plastic material, but less than the melting point of any other plastics contained in said plastic material.

37. The method of claim 36, further comprising repeating said method steps until all plastics contained in said plastic material are separated.

38. The method of claim 1, wherein said turpentine liquid is alpha-terpineol, beta-terpineol or a mixture thereof.

39. The method of claim 38, wherein said turpentine liquid's boiling point is greater than the melting points of plastics contained in said plastic material.

40. The method of claim 39, wherein said boiling point is greater under ambient pressure.

41. The method of claim 39, wherein said boiling point is elevated with pressurization.

42. The method of claim 1, further comprising the step of removing and separating impurities commingled with said material from said material, comprising the steps of heating the material until fillers and/or impurities are released into the dissolution and/or decomposition mixture, and separating said materials from said dissolution and/or decomposition mixture by liquid-solid separation.

43. The method of claim 42, wherein said liquid-solid separation is performed by hydrocycloning, sieving, sedimentation, flotation, filtration, or centrifugation.

44. The method of claim 10, wherein said plastic dissolving and/or decomposing composition contains a ratio of said turpentine liquid to said second liquid of greater than or equal to 1:1.

45. The method of claim 44, wherein said ratio is greater than or equal to about 3:1.

46. The method of claim 1, wherein said ratio is about 2:1 to 5:1.

* * * * *